US012472760B2

(12) United States Patent
Watanabe

(10) Patent No.: US 12,472,760 B2
(45) Date of Patent: Nov. 18, 2025

(54) HEAD-MAINTENANCE DEVICE AND LIQUID DISCHARGE APPARATUS

(71) Applicant: Tatsuroh Watanabe, Kanagawa (JP)

(72) Inventor: Tatsuroh Watanabe, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 177 days.

(21) Appl. No.: 18/244,307

(22) Filed: Sep. 11, 2023

(65) Prior Publication Data

US 2024/0123732 A1 Apr. 18, 2024

(30) Foreign Application Priority Data

Oct. 13, 2022 (JP) ................................ 2022-164443

(51) Int. Cl.
*B41J 29/17* (2006.01)
*B41J 2/165* (2006.01)

(52) U.S. Cl.
CPC ........... *B41J 29/17* (2013.01); *B41J 2/16508* (2013.01); *B41J 2/16532* (2013.01); *B41J 2/16579* (2013.01)

(58) Field of Classification Search
CPC ..... B41J 2/16523; B41J 2/16532; B41J 29/17
See application file for complete search history.

(56) References Cited

U.S. PATENT DOCUMENTS

| | | | | |
|---|---|---|---|---|
| 6,244,594 | B1 | 6/2001 | Araseki et al. | |
| 2009/0169222 | A1 | 7/2009 | Watanabe | |
| 2011/0050814 | A1 | 3/2011 | Tsubaki et al. | |
| 2011/0063385 | A1 | 3/2011 | Watanabe | |
| 2012/0050425 | A1 | 3/2012 | Watanabe | |
| 2012/0056933 | A1* | 3/2012 | Tanaka ..................... | B41J 29/38 347/30 |
| 2012/0133707 | A1* | 5/2012 | Kikkawa .............. | B41J 2/16532 347/30 |
| 2013/0235131 | A1 | 9/2013 | Watanabe et al. | |
| 2013/0335480 | A1* | 12/2013 | Kataniwa ............ | B41J 2/16508 347/29 |
| 2014/0015896 | A1 | 1/2014 | Katoh | |
| 2014/0063141 | A1 | 3/2014 | Tsubaki et al. | |
| 2014/0078212 | A1 | 3/2014 | Nakai et al. | |
| 2015/0165789 | A1 | 6/2015 | Watanabe et al. | |
| 2016/0129704 | A1 | 5/2016 | Watanabe et al. | |
| 2016/0167402 | A1 | 6/2016 | Nakai et al. | |

(Continued)

FOREIGN PATENT DOCUMENTS

| | | | | |
|---|---|---|---|---|
| CN | 102233738 A | * 11/2011 | .......... | B41J 2/16523 |
| JP | H09-240000 A | 9/1997 | | |

(Continued)

*Primary Examiner* — Sharon Polk
(74) *Attorney, Agent, or Firm* — XSENSUS LLP

(57) ABSTRACT

A head-maintenance device includes a suction cap to cap a nozzle surface of a head to discharge liquid, a suction unit to suck the inside of the suction cap, an air-release channel communicating with the inside of the suction cap, a lid to close an opening of the suction cap, and processing circuitry. The processing circuitry performs an air-release channel suction operation to close the air-release channel and suck the inside of the suction cap by the suction unit, with the opening of the suction cap closed by the lid, and open the air-release channel with the inside of the suction cap in a negative pressure.

19 Claims, 15 Drawing Sheets

(56) References Cited

U.S. PATENT DOCUMENTS

| | | | |
|---|---|---|---|
| 2017/0182799 A1 | | 6/2017 | Nakai et al. |
| 2018/0126751 A1 | | 5/2018 | Nakai et al. |
| 2019/0184709 A1 | | 6/2019 | Hasebe et al. |
| 2019/0255854 A1 | | 8/2019 | Asano et al. |
| 2020/0079091 A1 | | 3/2020 | Takahashi et al. |

FOREIGN PATENT DOCUMENTS

| | | | | |
|---|---|---|---|---|
| JP | H10119310 A | * | 5/1998 |
| JP | 2002086746 A | * | 3/2002 |
| JP | 2014-014993 A | | 1/2014 |
| JP | 2019-123206 A | | 7/2019 |

* cited by examiner

HEAD-MAINTENANCE DEVICE AND LIQUID DISCHARGE APPARATUS

CROSS-REFERENCE TO RELATED APPLICATION

This patent application is based on and claims priority pursuant to 35 U.S.C. § 119(a) to Japanese Patent Application No. 2022-164443, filed on Oct. 13, 2022, in the Japan Patent Office, the entire disclosure of which is hereby incorporated by reference herein.

BACKGROUND

Technical Field

Embodiments of the present disclosure relate to a head-maintenance device and a liquid discharge apparatus.

Related Art

An apparatus that includes a head for discharging liquid typically includes a maintenance device as a maintenance and recovery mechanism including a suction cap to cap a nozzle surface, i.e., a discharge surface of the head to maintain and recover the condition of the head.

An apparatus is known that includes a maintenance device in which a suction channel to collect liquid sucked from nozzles of a head into a suction cap and an air-release channel are connected to each other. The air-release channel introduces air into the suction cap sealed between the head and the suction cap to return the space inside the suction cap to an atmospheric pressure.

SUMMARY

In an embodiment of the present disclosure, a head-maintenance device includes a suction cap to cap a nozzle surface of a head to discharge liquid, a suction unit to suck the inside of the suction cap, an air-release channel communicating with the inside of the suction cap, a lid to close an opening of the suction cap, and processing circuitry. The processing circuitry performs an air-release channel suction operation to close the air-release channel and suck the inside of the suction cap by the suction unit, with the opening of the suction cap closed by the lid, and open the air-release channel with the inside of the suction cap in a negative pressure.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
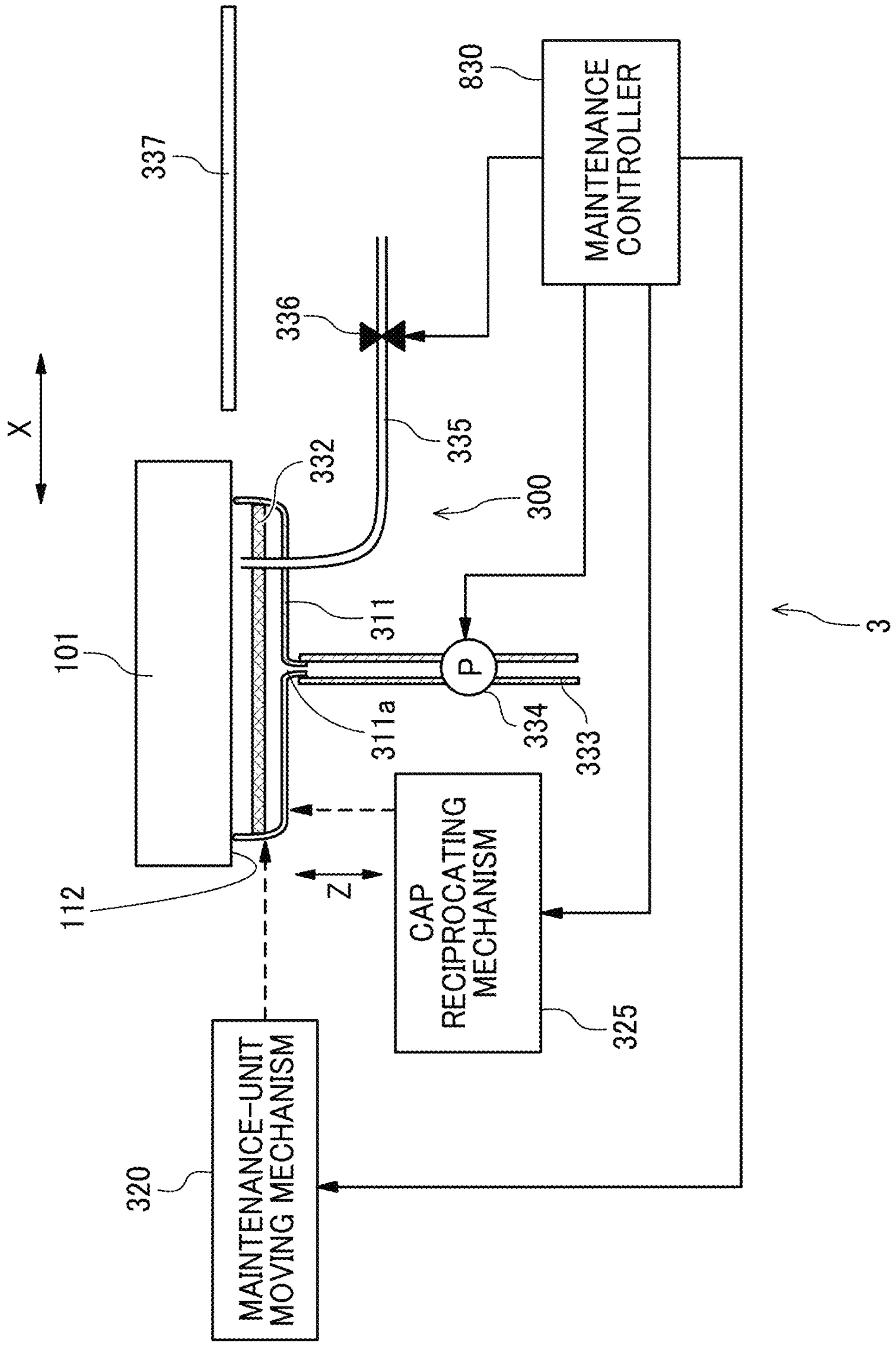
FIG. 1 is a diagram illustrating a head-maintenance device according to a first embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described below with reference to the accompanying drawings.

FIG. 1 is a diagram illustrating a head-maintenance device 3 according to a first embodiment of the present disclosure.

The head-maintenance device 3 includes a maintenance unit 300 and a maintenance controller 830. The maintenance controller 830 controls a maintenance operation performed by the maintenance unit 300.

The maintenance unit 300 includes a suction cap 311 to cap a nozzle surface 112 of a head 101 that discharges liquid. An absorber 332 is disposed in the suction cap 311. A drain channel 333 is connected to a suction hole 311*a* of the suction cap 311. A suction pump 334 serving as a suction unit that sucks the inside of the suction cap 311 is disposed in the drain channel 333.

The head-maintenance device 3 includes an air-release channel 335 communicating with the inside of the suction cap 311. An on-off valve 336 is disposed on the air-release channel 335. The air-release channel 335 can be opened and closed by opening and closing the on-off valve 336.

The head-maintenance device 3 further includes a lid 337 to close an opening of the suction cap 311. The lid 337 is made of a rigid material having a flat surface and is formed of, for example, a resin or a sheet metal. The lid 337 is disposed at the same height as the nozzle surface 112 of the head 101.

In the present embodiment, the head 101 and the suction cap 311 are relatively movable in X directions indicated by a double-headed arrow in FIG. 1. Similarly, the lid 337 and the suction cap 311 are also relatively movable in the X directions. The head 101 and the lid 337 may be integrally movable or individually movable. The head 101, the lid 337, and the suction cap 311 are relatively movable in Z directions indicated by a double-headed arrow in FIG. 1.

In the present embodiment, the suction cap 311 can reciprocate in the X directions by the maintenance-unit moving mechanism 320, and can be lifted and lowered, i.e., movable up and down, in the Z directions by a cap reciprocating mechanism 325. The head 101 and the lid 337 may reciprocate in the X directions and may move up and down in the Z directions. Alternatively, the suction cap 311 may reciprocate in the X directions and the head 101 and the lid 337 may move up and down in the Z directions.

The maintenance controller 830 drives and controls the maintenance-unit moving mechanism 320, the cap reciprocating mechanism 325, the suction pump 334, and the on-off valve 336 to control the maintenance operation including an air-release channel suction operation according to embodiments of the present disclosure.

FIGS. 2, 3, 4, and 5 are diagrams each illustrating the head 101 and the maintenance operation controlled by the maintenance controller 830, according to the present embodiment.

When the maintenance operation is started, as illustrated in FIG. 1, the maintenance controller 830 closes the on-off valve 336 to close the air-release channel 335. As illustrated in FIG. 1, the maintenance controller 830 drives and controls the cap reciprocating mechanism 325 such that the suction cap 311 moves up to a position at which the suction cap 311 faces the head 101 to cap the nozzle surface 112.

Figure 2:
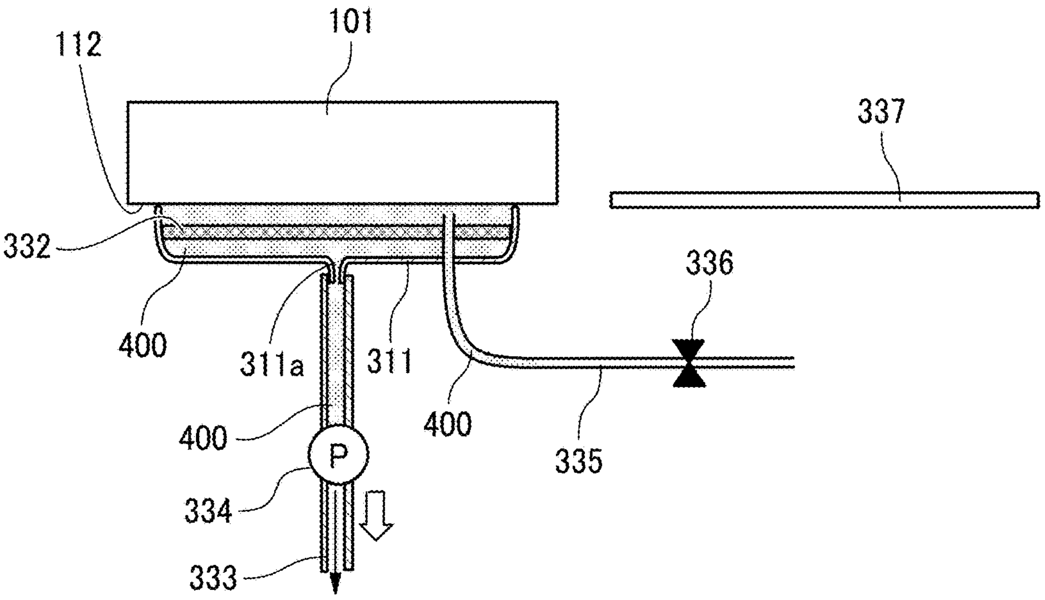
FIG. 2 is a diagram illustrating how a maintenance operation is controlled by a maintenance controller, in which the maintenance controller causes liquid to be sucked from a head and drained into a suction cap, according to the first embodiment of the present disclosure.

Subsequently, the maintenance controller 830 drives the suction pump 334 to generate a negative pressure inside the suction cap 311. As illustrated in FIG. 2, the maintenance controller 830 causes liquid, which turns to be waste liquid 400, to be sucked from the head 101 and drained into the suction cap 311. This operation is referred to as a nozzle suction operation.

In so doing, a negative pressure is also generated in a portion of the drain channel 333 from the suction cap 311 to the suction pump 334. Accordingly, the waste liquid 400 enters into the drain channel 333. A negative pressure is also generated in a portion of the air-release channel 335 from the suction cap 311 to the on-off valve 336. Accordingly, the waste liquid 400 also enters into the air-release channel 335.

Figure 3:
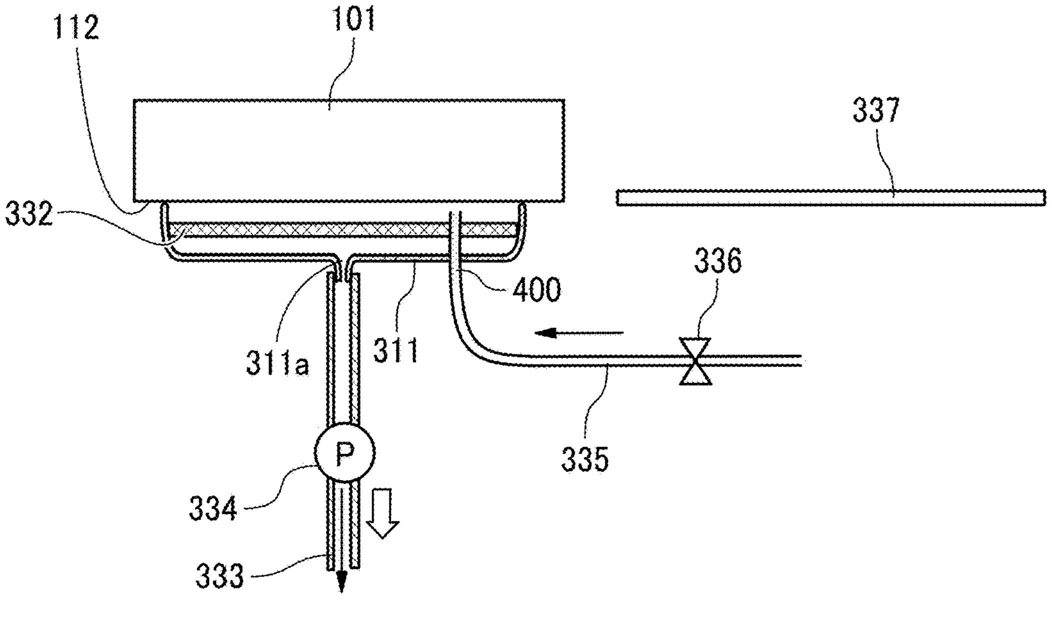
FIG. 3 is a diagram illustrating how the maintenance operation of FIG. 2 is controlled such that an on-off valve is opened to open the air-release channel.

The maintenance controller 830 continues the nozzle suction operation until a predetermined time elapses from the start of driving the suction pump 334. Subsequently, as illustrated in FIG. 3, the maintenance controller 830 causes the on-off valve 336 to open such that the air-release channel 335 is opened.

Such a configuration as described above allows air to be introduced through the air-release channel 335 into the suction cap 311 set to have the negative pressure. Accordingly, the waste liquid 400 in the suction cap 311 is sucked by the suction of the suction pump 334 to be drained to, for example, a waste-liquid container through the drain channel 333.

The waste liquid 400 that has entered the air-release channel 335 is also drained into the suction cap 311 and is drained to, for example, the waste-liquid container through the drain channel 333. However, the waste liquid 400 that has entered the air-release channel 335 is not entirely drained only by introducing air into the suction cap 311 through the air-release channel 335, and a part of the waste liquid 400 may remain in the air-release channel 335 as illustrated in FIG. 3.

Subsequently, the maintenance controller 830 stops driving the suction pump 334, drives and controls the cap reciprocating mechanism 325 to move down the suction cap 311, and retracts the suction cap 311 from the nozzle surface 112 of the head 101 to decap the nozzle surface 112.

Then, the maintenance controller 830 closes the air-release channel 335 to suck the inside of the suction cap 311 by the suction pump 334 when the opening of the suction cap 311 is closed by the lid 337, and controls the air-release channel suction operation to open the air-release channel 335 when the inside of the suction cap 311 is set to the negative pressure.

Figure 4:
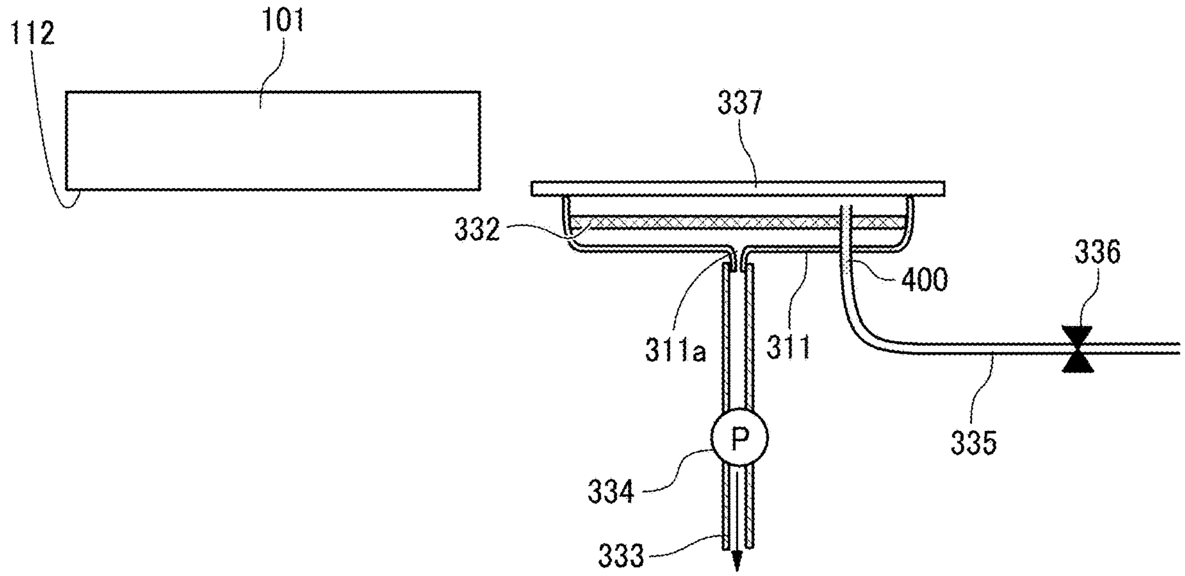
FIG. 4 is a diagram illustrating how the maintenance operation of FIG. 2 is controlled such that the suction cap is relatively moved to a position facing a lid.

In the above-described air-release channel suction operation, first, the maintenance controller 830 drives and controls the maintenance-unit moving mechanism 320 to cause the suction cap 311 to relatively move to a position facing the lid 337 as illustrated in FIG. 4.

As illustrated in FIG. 4, the maintenance controller 830 drives and controls the cap reciprocating mechanism 325 to move up the suction cap 311 and causes the suction cap 311 to contact the lid 337 such that the opening of the suction cap 311 is closed by the lid 337. Subsequently, the maintenance controller 830 closes the on-off valve 336.

As the maintenance controller 830 drives the suction pump 334 for a predetermined period of time under the above conditions, the inside of the suction cap 311 and the inside of the portion of the air-release channel 335 from the suction cap 311 to the on-off valve 336 is set to the negative pressure.

Figure 5:
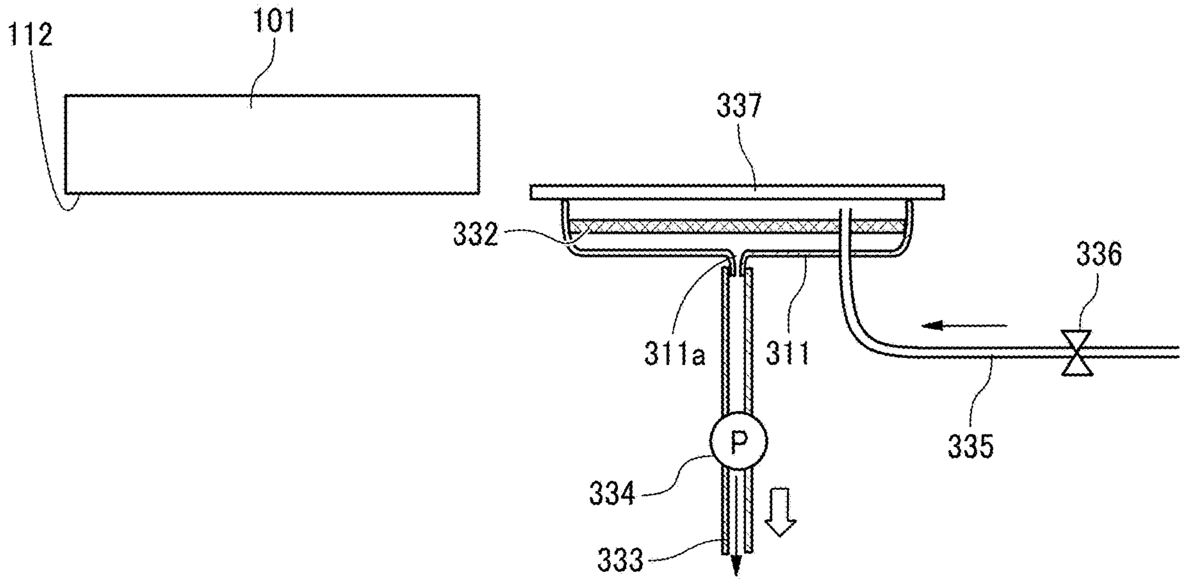
FIG. 5 is a diagram illustrating how the maintenance operation of FIG. 2 is controlled such that an on-off valve is opened.

After the predetermined period of time elapses from the start of driving the suction pump 334, the maintenance controller 830 opens the on-off valve 336 as illustrated in FIG. 5. As a result, air flows into the air-release channel 335 at once, and the waste liquid 400 that has remained in the air-release channel 335 flows into the suction cap 311 and is drained through the drain channel 333.

As the suction cap 311 is capped by the lid 337 when the suction pump 334 is driven, the inside of the suction cap 311 and the inside of the air-release channel 335 can be set to a high negative pressure. When the on-off valve 336 is opened under the above conditions, the air flows into the air-release channel 335 at once, and the waste liquid 400 that has remained in the air-release channel 335 is pushed away toward the suction cap 311. Accordingly, the residual waste liquid 400 is eliminated from the air-release channel 335, and occurrence of clogging of the air-release channel 335 due to fixation of the waste liquid 400 over time can be prevented. As a result, deterioration of the maintenance performance of the head-maintenance device 3 over time can be prevented.

The above-described air-release channel suction operation can be repeated multiple times. Accordingly, the waste liquid 400 that has entered the air-release channel 335 can be reliably drained. At this time, the number of repetitions of the air-release channel suction operation can be changed depending on, for example, environmental conditions, or the type of liquid to be discharged. Such a configuration as described above allows the maintenance operation of the head-maintenance device 3 to be performed in a more efficient manner.

Figure 6:
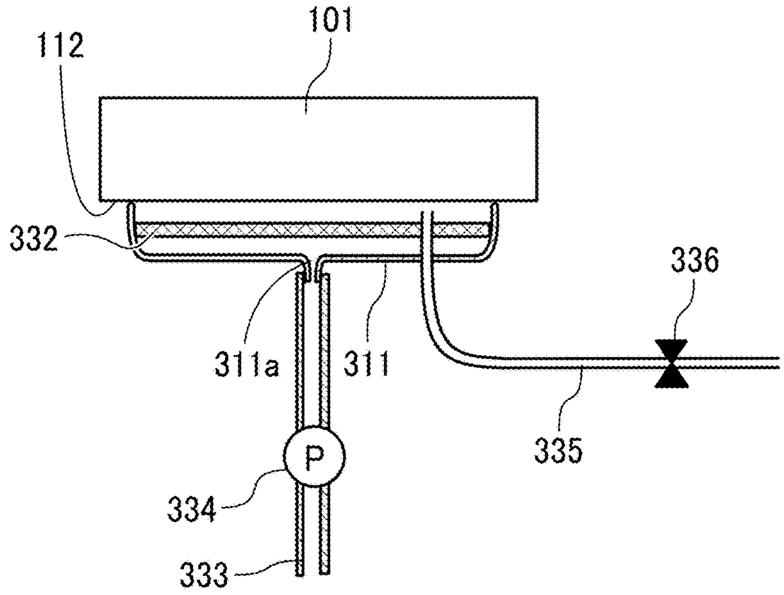
FIG. 6 is a diagram illustrating a head-maintenance device according to a control sample of the present disclosure.
Figure 7:
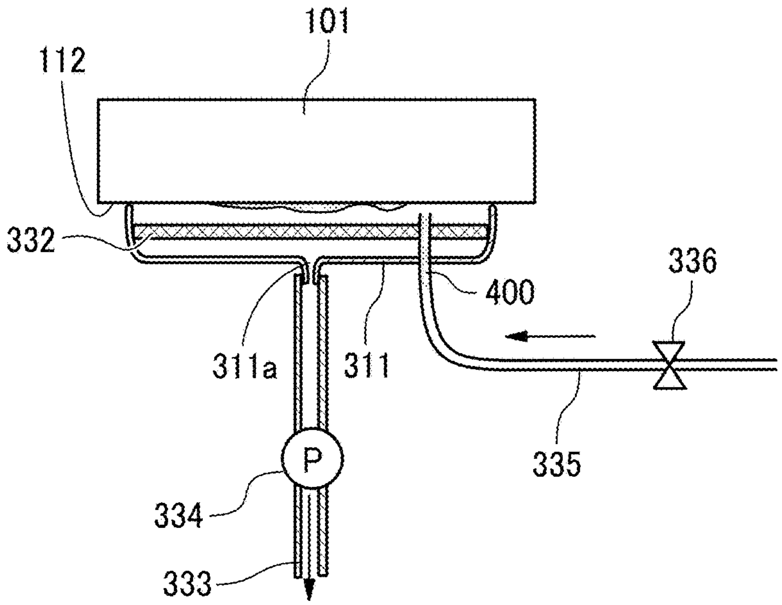
FIG. 7 is a diagram illustrating the head-maintenance device of FIG. 6 in which an air-release channel suction operation is performed.

FIGS. 6 and 7 are diagrams each illustrating a maintenance device according to a control sample of the present disclosure.

The maintenance device according to the control sample does not include the lid 337 of the first embodiment.

In the maintenance device of the control sample, when the waste liquid 400 in the suction cap 311 is drained, the waste liquid 400 that has entered the air-release channel 335 may remain in the air-release channel 335 without being drained, as described in FIG. 3 of the first embodiment.

When the waste liquid 400 remains in the air-release channel 335, the waste liquid 400 may be solidified over time and may block a part or all of the air-release channel 335. In such a case, when air inside the suction cap 311 is released to the outside, the air may not flow into the suction cap 311, or it may take time for the air to flow into the suction cap 311. Accordingly, the waste liquid 400 in the suction cap 311 may not be drained.

In the present control sample, even if the suction force of the suction pump 334 is increased to suck the waste liquid 400 in the air-release channel 335, as illustrated in FIG. 7, the liquid, i.e., the waste liquid 400, is sucked only from the head 101. Accordingly, the residual waste liquid 400 in the air-release channel 335 is not drained into the suction cap 311.

Alternatively, in the above-described first embodiment, the waste liquid 40 is sucked from the air-release channel 335 when the opening of the suction cap 311 is closed by the lid 337, not when the nozzle surface of the head 101 is capped. Such a configuration as described above allows the suction force of the suction pump 334 to be increased to suck and drain the waste liquid 400 in the air-release channel 335. Thus, the residual amount of the waste liquid 400 in the air-release channel 335 can be reduced.

In other words, the maintenance controller 830 can control such that the output of the suction pump 334 when the air-release channel suction operation is performed is higher than the output of the suction pump 334 when the nozzle suction operation is performed. Accordingly, the residual waste liquid 400 in the air-release channel 335 can be more reliably drained.

The air-release channel suction operation does not need to be performed every time the nozzle suction operation is performed. The timing at which the air-release channel suction operation is performed can be changed depending on the environmental condition or the type of liquid to be discharged. At the same time, the timing at which the air-release channel suction operation is performed can be changed depending on a print job for which the liquid is discharged from the head 101.

Figure 8:
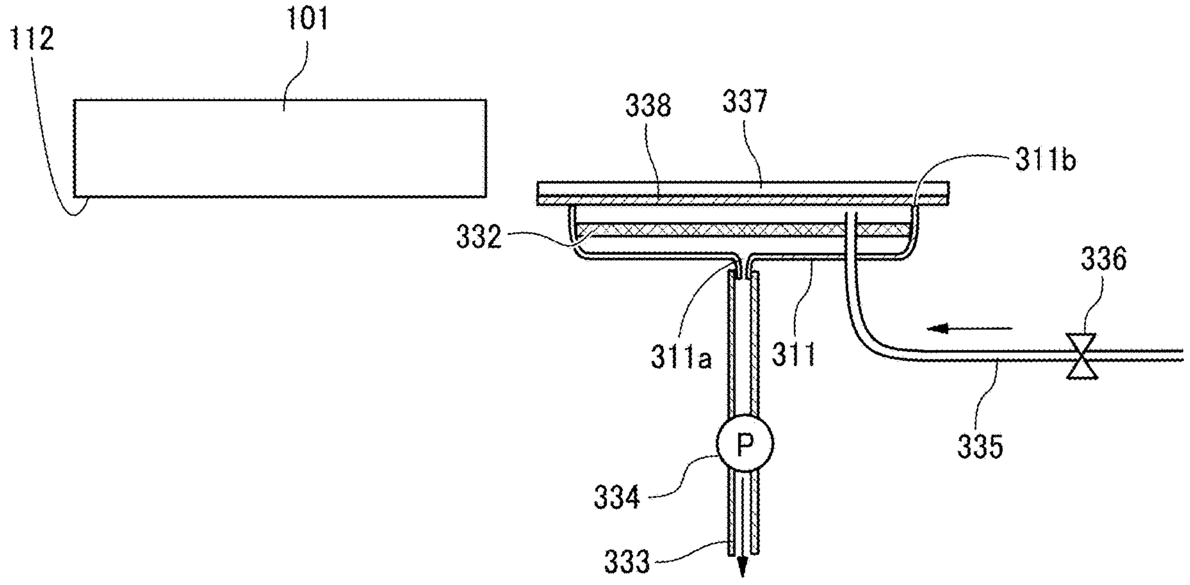
FIG. 8 is a diagram illustrating a head-maintenance device according to a second embodiment of the present disclosure.

FIG. 8 is a diagram illustrating the head-maintenance device 3 according to a second embodiment of the present disclosure.

In the second embodiment, an absorber 338 is disposed on a surface of the lid 337 with which the suction cap 311 contacts. A porous body such as a sponge or a nonwoven fabric is employed for the absorber 338.

The head-maintenance device 3 according to the second embodiment has such a configuration as described above. Accordingly, in the maintenance operation, when the suction cap 311 is pressed against the lid 337 to close the opening of the suction cap 311, the waste liquid 400 that adheres to a nip **331*a* as a contact portion of the suction cap 311 can be absorbed by the absorber 338**.

In other words, in the present embodiment, the lid 337 also functions as a stamper when performing a stamper operation for removing the waste liquid adhered to the nip **331*b* of the suction cap 311 from the nip 331*b***.

As a result, the maintenance time can be shortened as compared with a case in which a stamper is separately disposed to perform the stamper operation.

Figure 9:
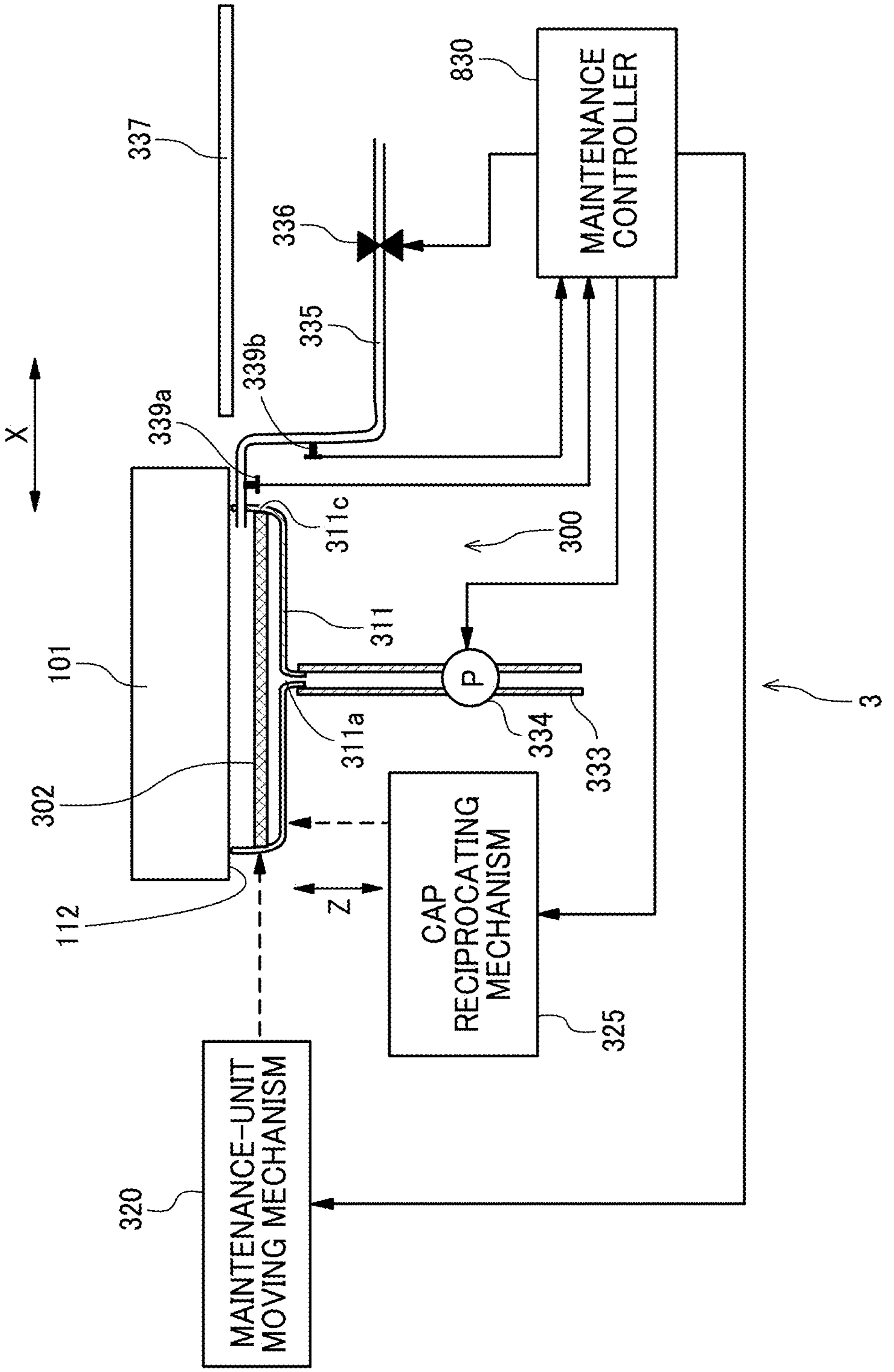
FIG. 9 is a diagram illustrating a head-maintenance device according to a third embodiment of the present disclosure.

FIG. 9 is a diagram illustrating the head-maintenance device 3 according to a third embodiment of the present disclosure.

In the third embodiment, entry sensors **339*a* and 339*b* are disposed as liquid sensors to detect the waste liquid 400 in the air-release channel 335. The entry sensor 339*a* is disposed at a position close to the suction cap 311 on the air-release channel 335, and the entry sensor 339*b* is disposed at a position closer to the on-off valve 336 than the entry sensor 339*a* on the air-release channel 335**.

In the third embodiment, the air-release channel 335 is connected to the inside of the suction cap 311 through a peripheral wall **311*c* of the suction cap 311. Accordingly, the entry sensor 339*a* can be disposed at a position such that the entry sensor 339*a* can detect the waste liquid 400 in the vicinity of an inlet portion of the air-release channel 335 close to the suction cap 311**.

When a reflective or transmissive optical sensor is employed as the entry sensors **339*a* and 339*b*, the air-release channel 335 is formed of, for example, a transparent tube. The entry sensors 339*a* and 339*b* are not limited to optical sensors, and for example, electrostatic sensors may be employed for the entry sensors 339*a* and 339*b*. For example, the number of the entry sensors 339*a* and 339*b* and the positions at which the entry sensors 339*a* and 339*b*** are disposed are not limited to the above example.

Detection outputs of the entry sensors **339*a* and 339*b* are input to the maintenance controller 830**.

When the maintenance operation is performed, the maintenance controller 830 determines whether at least one of the entry sensors **339*a* and 339*b* detects the waste liquid 400. At this time, when at least one of the entry sensors 339*a*** and 339*b* detects the waste liquid 400, the maintenance controller 830 controls such that the above-described air-release channel suction operation is performed a predetermined number of times. On the other hand, when the entry sensors 339*a* and 339*b* do not detect the waste liquid 400, the maintenance controller 830 controls such that the air-release channel suction operation as a part of the maintenance operation is not performed.

As a result, an unnecessary air-release channel suction operation does not need to be performed. Accordingly, the time to perform the maintenance operation can be shortened.

When the entry sensor 339*a* detects the waste liquid 400, i.e., the waste liquid 400 is present in the air-release channel 335 and the entry sensor 339*b* does not detect the waste liquid 400, i.e., the waste liquid 400 is not present in the air-release channel 335, the air-release channel suction operation is performed N times, N is an integer of one or more, which is a predetermined number of times. When both of the entry sensors 339*a* and 339*b* detect the waste liquid 400 and the waste liquid 400 is present in the air-release channel 335, the air-release channel suction operation is performed N+n times, N and n are integers of one or more, which is a predetermined number of times. In other words, the number of times of the air-release channel suction operation can be changed in accordance with the length of an area in which the waste liquid 400 enters in the air-release channel 335.

As a result, the air-release channel suction operation can be performed more efficiently, and the waste liquid 400 that has entered the air-release channel 335 can be reliably drained.

FIGS. 10A, 10B, 10C, and 10D are diagrams each illustrating the head-maintenance device 3 according to a fourth embodiment of the present disclosure.

In the fourth embodiment, multiple heads 101*a*, 101*b*, 101*c*, and 101*d*, four heads in the present embodiment, are arranged, and one suction cap 311 shared by the heads 101*a*, 101*b*, 101*c*, and 101*d* is disposed. The heads 101*a*, 101*b*, 101*c*, and 101*d* may also be referred to simply as the head 101 when a similar description applies to all the heads 101*a*, 101*b*, 101*c*, and 101*d*. A lid 337*a* and a lid 337*b* are disposed on both sides outside an area in which the heads 101*a*, 101*b*, 101*c*, and 101*d* are arranged.

Figures 10A, 10B, 10C, 10D:
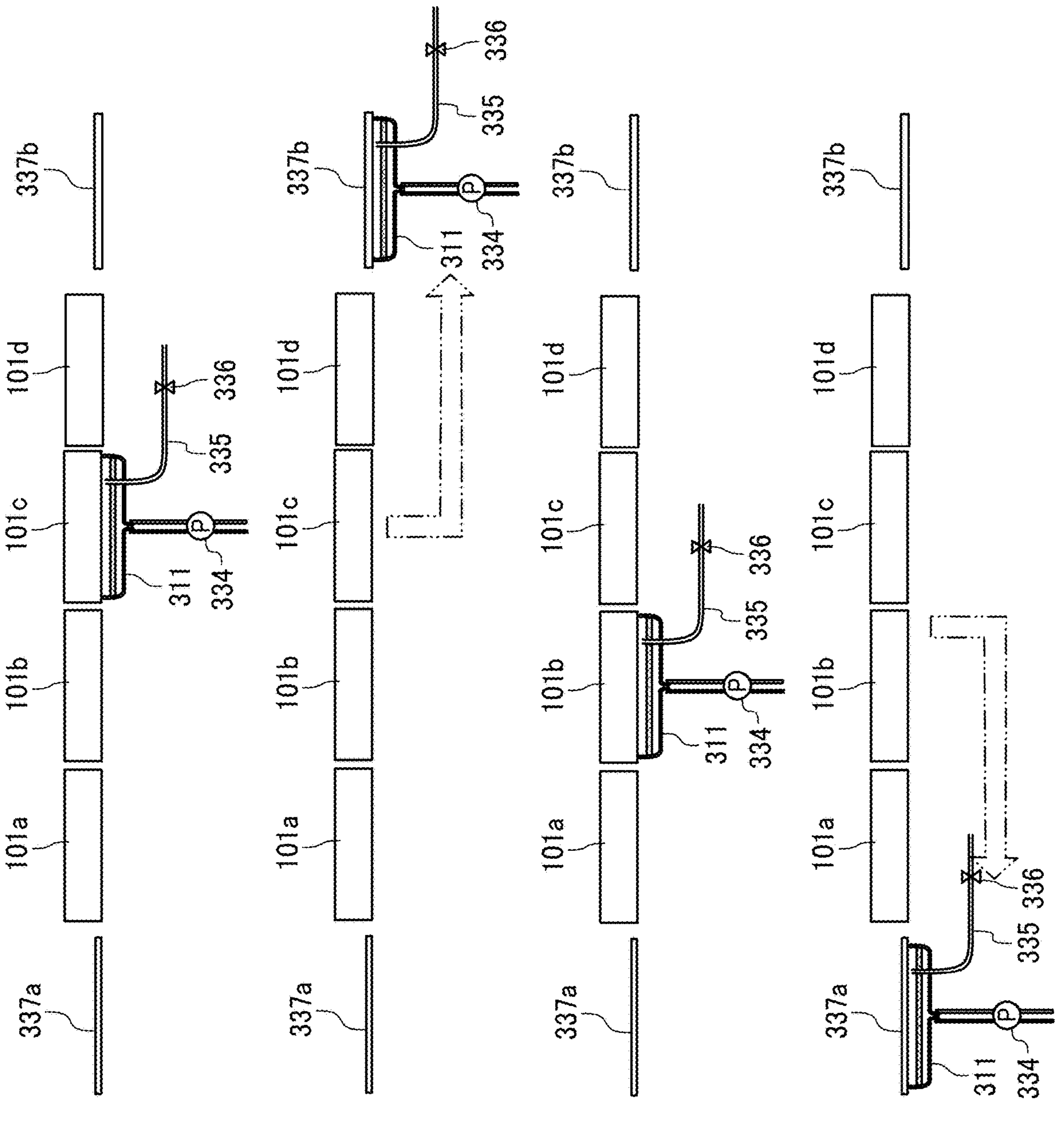
FIGS. 10A, 10B, 10C, and 10D are diagrams each illustrating a head-maintenance device according to a fourth embodiment of the present disclosure.

In such a configuration as described above, when the maintenance operation of the head 101*c* is performed as illustrated in FIG. 10A, the suction cap 311 is moved to the lid 337*b* disposed at a relatively short distance from the head 101*c* to perform the air-release channel suction operation as illustrated in FIG. 10B. The maintenance operation of the head 101*d* is performed in a similar manner to the maintenance operation of the head 101*c* described above.

Alternatively, when the maintenance operation of the head 101*b* is performed as illustrated in FIG. 10C, the suction cap 311 is moved to the lid 337*a* disposed at a relatively short distance from the head 101*b* to perform the air-release channel suction operation as illustrated in FIG. 10D. The maintenance operation of the head 101*a* is performed in a similar manner to the maintenance operation of the head 101*b* described above.

As a result, when the multiple heads 101*a*, 101*b*, 101*c*, and 101*d* are arranged, a movement distance of the suction cap 311 relative to the heads 101*a*, 1011*b*, 101*c*, and 101*d* for performing the air-release channel suction operation is shorter than a case in which the single lid 337 is disposed at one position. For this reason, the time to perform the maintenance operation of the entire multiple heads 101*a*, 101*b*, 101*c*, and 101*d* can be shortened.

The number of heads, the number of suction caps, and the number of lids are not limited to the examples described in the above embodiments. For example, in the configuration described in, for example, the above-described first embodiment, the lids may be disposed on both outer sides of the head.

Figure 11:
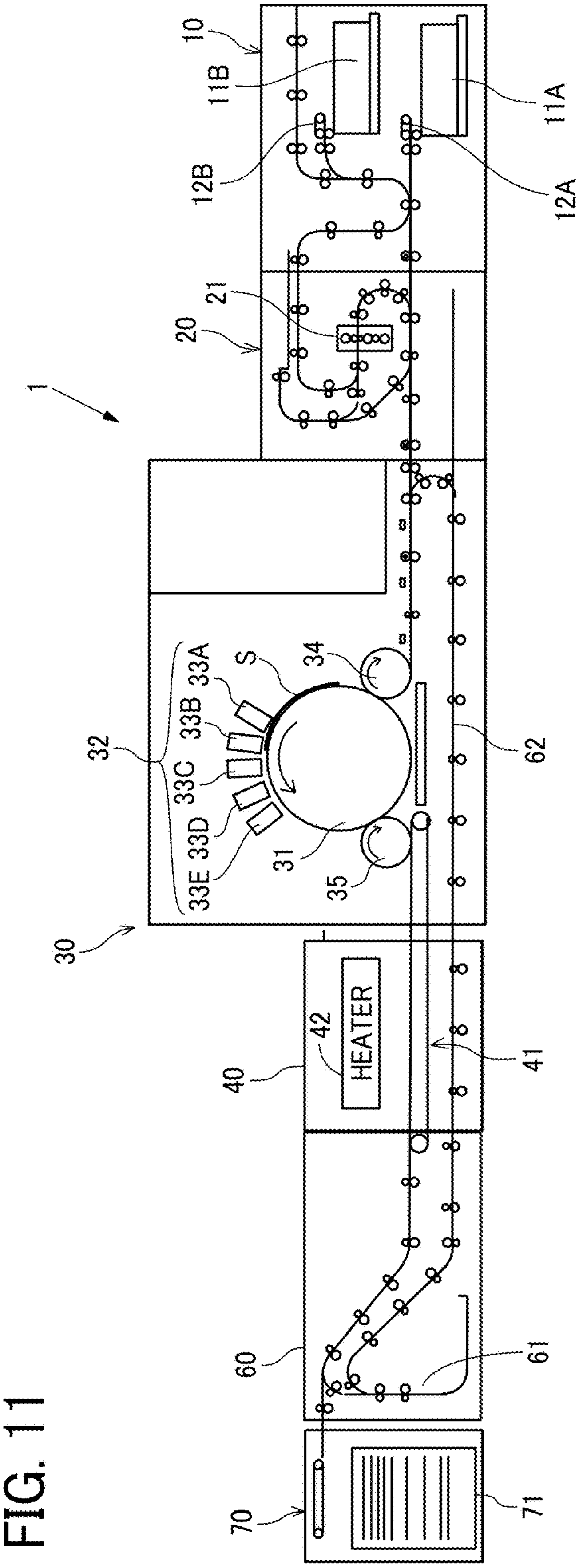
FIG. 11 is a schematic diagram illustrating a printer as an apparatus for discharging liquid, according to a fifth embodiment of the present disclosure.

FIG. 11 is a schematic diagram of a printer 1 as an apparatus for discharging liquid according to a fifth embodiment of the present disclosure.

Figure 12:
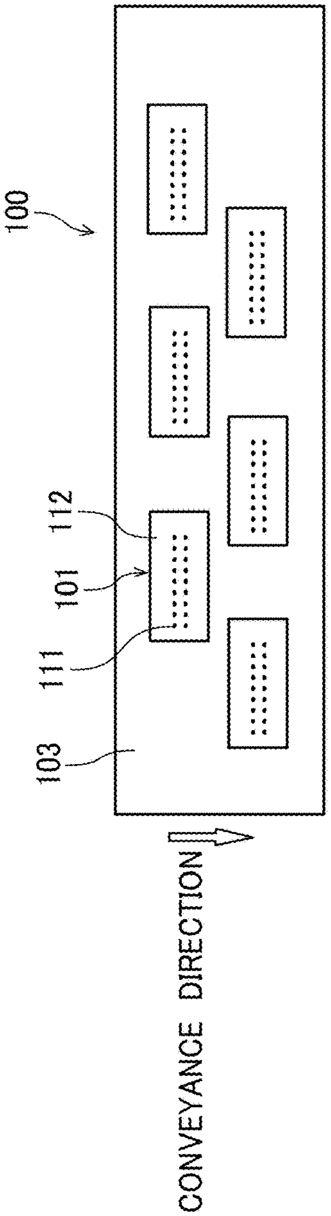
FIG. 12 is a plan view of a discharge unit according to the fifth embodiment of the present disclosure.

FIG. 12 is a plan view of a discharge unit provided for the printer of FIG. 11.

The printer 1 includes a loading device 10 to load sheet materials S into the printer 1, a pretreatment device 20 as a coater, a printing device 30, a first drier 40, a second drier 50, a reversing mechanism 60, and a sheet stacker 70.

In the printer 1, the pretreatment device 20 applies pretreatment liquid as application liquid to a sheet material S fed and supplied from the loading device 10 as needed, and the printing device 30 applies given liquid to the sheet material S to perform printing as desired.

After the liquid that has adhered to the sheet material S is dried by the first drier 40 and the second drier 50, the printer 1 ejects the sheet material S to the sheet stacker 70 via the reversing mechanism 60 as is, or ejects the sheet material S after printing has been performed on both sides of the sheet material S.

The loading device 10 includes a lower loading tray 11A and an upper loading tray 11B to accommodate multiple sheet materials S and a feeding device 12A and a feeding device 12B to separate and feed the sheet materials S one by one from the lower loading tray 11A and the upper loading tray 11B, respectively, and supplies the sheet materials S to the pretreatment device 20.

The pretreatment device 20 includes, for example, a coater 21 as a treatment-liquid applying device to coat an image formation surface of a sheet material S with a treatment liquid having an effect of aggregating ink particles to prevent bleed-through.

The printing device 30 includes a drum 31 and a liquid discharger 32. The drum 31 is a bearer or a rotator that bears a sheet material S on a circumferential surface of the drum 31 and rotates. The liquid discharger 32 discharges liquid toward the sheet material S borne on the drum 31.

The printing device 30 includes transfer cylinders 34 and 35. The transfer cylinder 34 receives a sheet material S from the pretreatment device 20 and forwards the sheet material S to the drum 31. The transfer cylinder 35 receives the sheet material S conveyed by the drum 31 and forwards the sheet material S to the drier 40.

The transfer cylinder 34 includes a sheet gripper to grip the leading end of the sheet material S conveyed from the pretreatment device 20 to the printing device 30. The sheet material S that is gripped by the sheet gripper is conveyed as the transfer cylinder 34 rotates. The sheet material S conveyed by the transfer cylinder 34 is forwarded to the drum 31 at a position facing the drum 31.

Similarly, the drum 31 includes a sheet gripper on the surface of the drum 31, and the leading end of the sheet material S is gripped by the sheet gripper. The drum 31 includes multiple suction holes dispersedly formed on the surface of the drum 31, and a suction unit. The suction unit generates suction airflows directed inward of the drum 31 from the suction holes of the drum 31.

The sheet gripper of the drum 31 grips the leading end of the sheet material S forwarded from the transfer cylinder 34 to the drum 31, and the sheet material S is attracted to and borne on the drum 31 by the suction airflows generated by the suction unit. As the drum 31 rotates, the sheet material S is conveyed.

The liquid discharger 32 includes discharge units 33A, 33B, 33C, 33D, and 33E as liquid application units. The discharge units 33A, 33B, 33C, 33D, and 33E may also be referred to simply as the discharge unit 33 when a similar description applies to all the discharge units 33A, 33B, 33C, 33D, and 33E. For example, the discharge unit 33A discharges liquid of cyan (C), the discharge unit 33B discharges liquid of magenta (M), the discharge unit 33C discharges liquid of yellow (Y), and the discharge unit 33D discharges liquid of black (K). The discharge unit 33E is used to discharge a special liquid, for example, a liquid of spot color such as white, gold, or silver.

The discharge unit 33 includes, for example, a head array 100 (see FIG. 12) which is a liquid discharger.

The head array 100 includes a full-line head in which the multiple heads 101 each having multiple nozzle rows, in which multiple nozzles 111 are arranged on the nozzle surface 112, are arranged in a staggered manner on a base 103. Each of the discharge units 33A, 33B, 33C, 33D, and 33E also includes a sub-tank as a liquid container that stores liquid to be supplied to corresponding ones of the heads 101 of the head array 100.

The discharge operation of each of the discharge units 33A, 33B, 33C, and 33D of the liquid discharger 32 is controlled by drive signals corresponding to print data. When a sheet material S borne on the drum 31 passes through an area facing the liquid discharger 32, the liquid of multiple colors is discharged from the discharge units 33A, 33B, 33C, 33D, and 33E, and an image corresponding to the print data is printed.

The drier 40 includes a heater 42 such as an infrared (IR) heater and irradiates infrared light to a sheet material S, to which the liquid has been applied and conveyed by a conveyor 41 including, for example, a conveyance belt, to heat and dry the sheet material S.

The reversing mechanism 60 includes a reversing device 61 and a duplex conveyor 62. The reversing device 61 reverses a sheet material S by a switchback method when duplex printing is performed on the sheet material S that has passed through the drier 40 and has liquid applied to one surface of the sheet material S and dried. The duplex conveyor 62 reversely conveys the reversed sheet material S upstream from the transfer cylinder 34 of the printing device 30.

The sheet stacker 70 includes an output tray 71 on which multiple sheet materials S are stacked. The sheet materials S that are conveyed from the reversing mechanism 60 are sequentially stacked one on another and held on the output tray 71.

In the present embodiment, an example in which the sheet material S is a cut sheet material is described. However, embodiments of the present disclosure can be applied to, for example, an apparatus that employs a large-sized sheet material such as wallpaper, a continuous medium such as continuous paper and a web-shaped sheet material.

Figure 13:
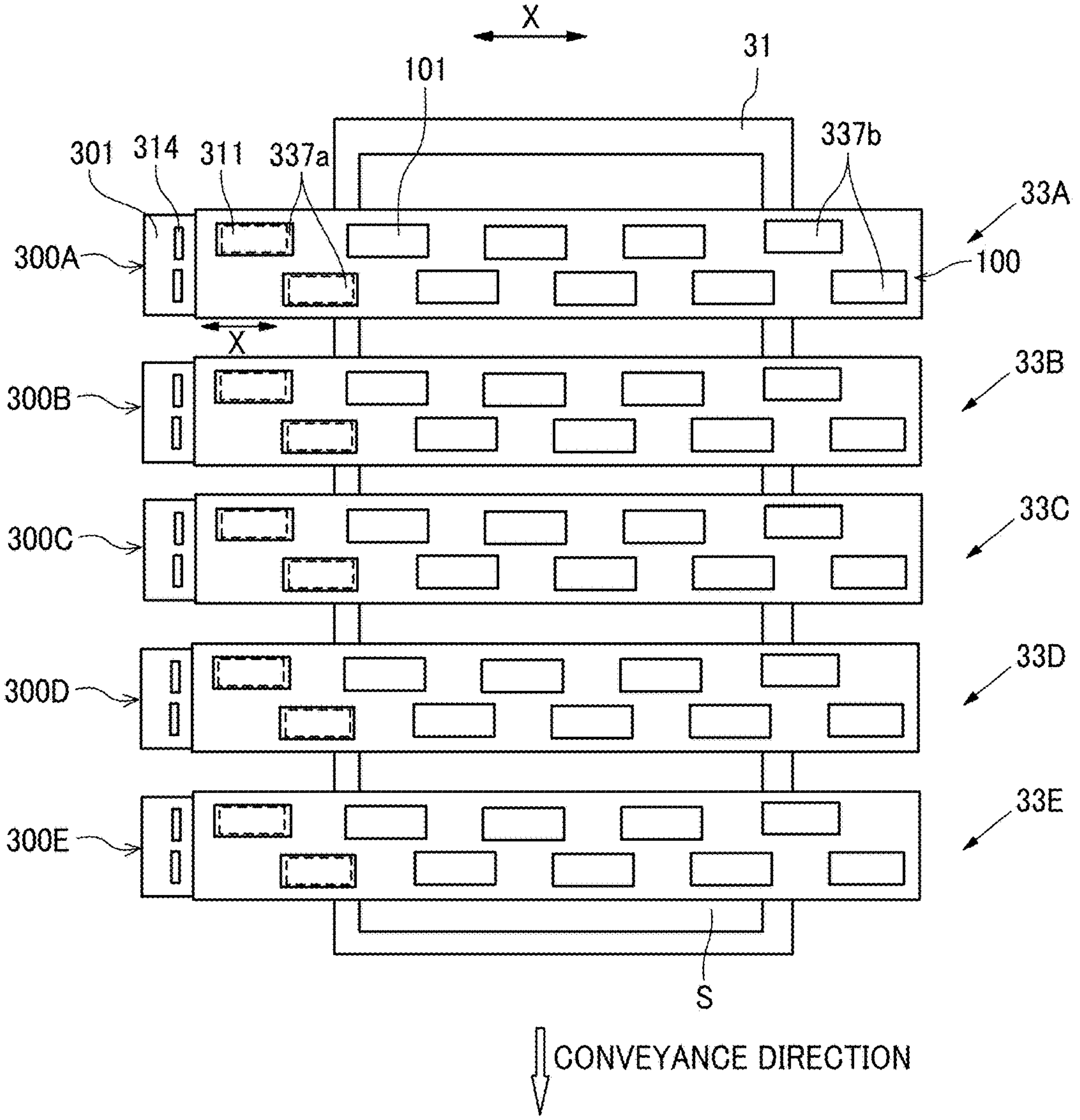
FIG. 13 is a plan view of maintenance units and head arrays according to the fifth embodiment of the present disclosure.

FIG. 13 is a plan view of the maintenance units 300A. 300B, 300C, 300D, and 300E and the head arrays 100 according to the present embodiment. The maintenance units 300A, 300B. 300C, 300D, and 300E may also be referred to simply as the maintenance unit 300 when a similar description applies to all the maintenance units 300A, 300B, 300C, 300D, and 300E.

Figure 14:
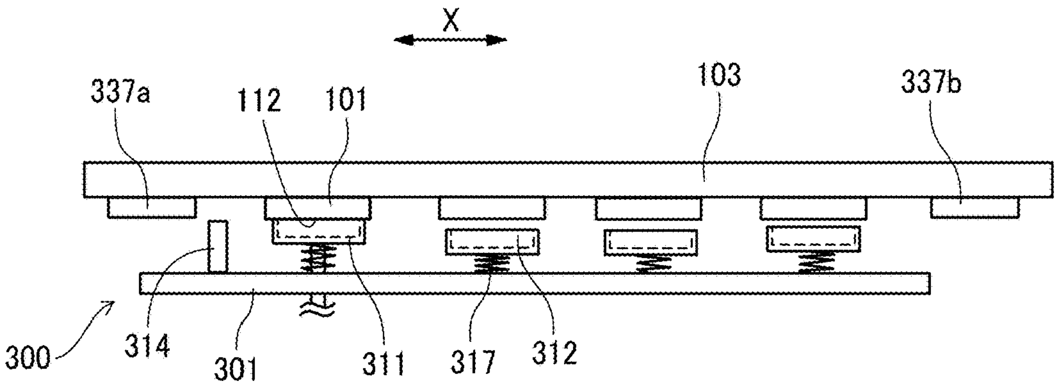
FIG. 14 is a front view of a maintenance unit according to the fifth embodiment of the present disclosure.

FIG. 14 is a front view of the maintenance unit 300 and the head array 100 according to the present embodiment.

Figure 15:
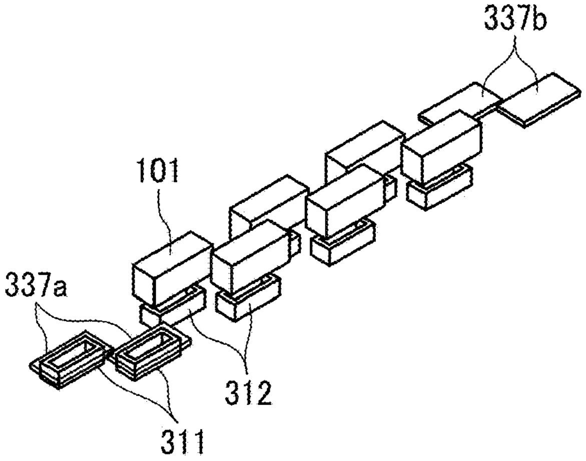
FIG. 15 is a perspective view of the maintenance unit according to the fifth embodiment of the present disclosure.

FIG. 15 is a perspective view of the maintenance unit 300 and the head array 100 according to the present embodiment.

In FIG. 13, the drum 31 is unfolded. In FIG. 14, only one row of the heads 101 is illustrated at capping positions at which the heads 101 are capped by moisture-retention caps 312.

In FIG. 13, the maintenance units 300A, 300B, 300C, 300D, and 300E corresponding to the discharge units 33A, 33B. 33C. 33D, and 33E, respectively, are disposed to be movable in directions indicated by a double-headed arrow X, which is a direction in which the heads 101 are arranged.

In the maintenance unit 300, the suction caps 311 that cap the respective nozzle surfaces 112 of the heads 101, the moisture-retention caps 312, and a blade-shaped wiper 314 to wipe the nozzle surfaces 112 are arranged on a base 301.

The maintenance unit 300 includes the lids 337*a* and 337*b*, each held on each of both sides outside the row of the heads 101 on the base 103 of the discharge unit 33. The lids 337*a* and 337*b* can also be used as the stampers as described in the second embodiment.

As described in the first embodiment, the drain channel 333 in which the suction pump 334 as the suction unit is disposed and the air-release channel 335 in which the on-off valve 336 is disposed are connected to the suction cap 311. The suction cap 311 is disposed to be vertically movable with respect to the base 301 and moves toward and retracts from the nozzle surface 112 of the head 101. Each of the moisture-retention caps 312 is held on the base 301 via an elastic member 317.

Such a configuration as described above allows each of the suction caps 311 and the corresponding one of the moisture-retention caps 312 to individually move toward and retract from the nozzle surface 112.

As illustrated in FIG. 14, the heights at which the suction caps 311 and the moisture-retention caps 312 contact the respective nozzle surfaces 112 are different from each other. In other words, the moisture-retention cap 312 does not contact the nozzle surface 112 when the nozzle surface 112 is capped by the suction cap 311.

The suction caps 311, the moisture-retention caps 312, and the wiper 314 are disposed at positions relative to the rows of the heads 101 disposed in a staggered manner.

In the present embodiment, the number of the moisture-retention caps 312 is the same as the number of the heads 101, and all the heads 101 can be capped with the respective moisture-retention caps 312. When the nozzle surface 112 is capped by the moisture-retention cap 312, the suction cap 311 does not cap the nozzle surface 112.

Figure 16A:
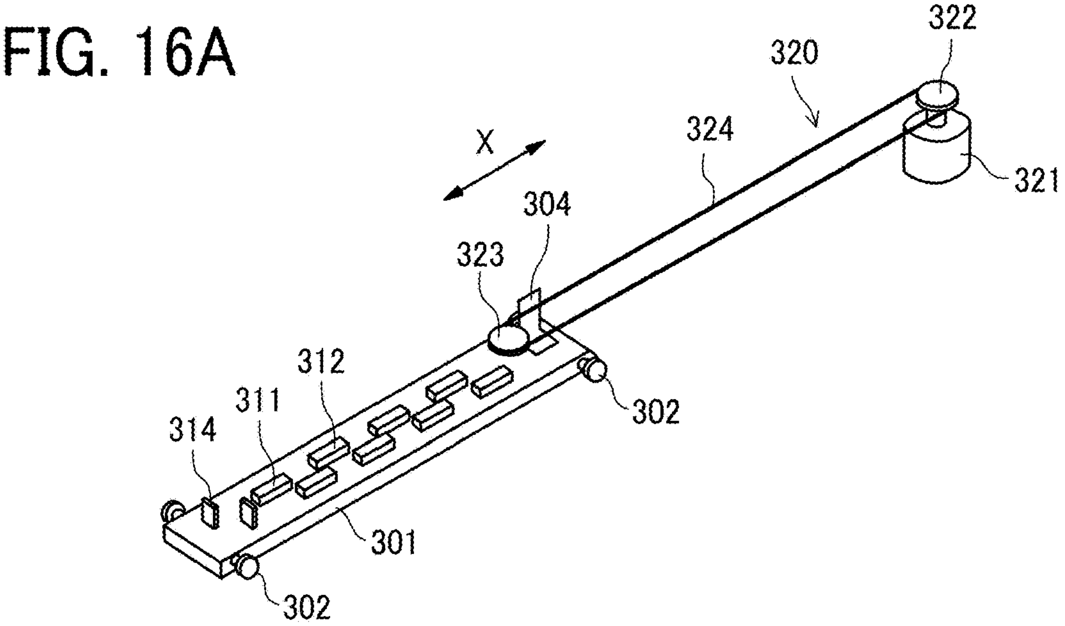
FIG. 16A is a perspective view of a maintenance-unit moving mechanism of the maintenance unit according to the fifth embodiment of the present disclosure.
Figure 16B:
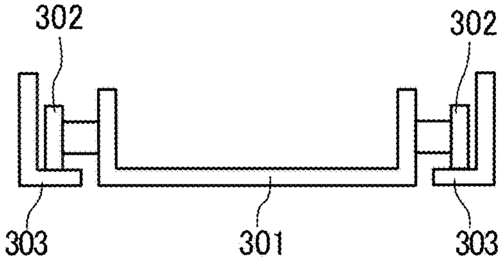
FIG. 16B is a cross-sectional view of the maintenance-unit moving mechanism of FIG. 16A.

FIG. 16A is a perspective view of the maintenance-unit moving mechanism 320 of the maintenance unit 300, according to the present embodiment. FIG. 16B is a side view of the maintenance-unit moving mechanism 320 of the maintenance unit 300, according to the present embodiment.

In the maintenance unit 300, rollers 302 are rotatably attached to both ends of the base 301 in the longitudinal direction, i.e., in a direction in which the maintenance unit 300 moves. The maintenance unit 300 is movably held by guides 303, disposed in a direction in which the heads are arranged, via the rollers 302.

The maintenance-unit moving mechanism 320 includes a timing belt 324 wound around a motor pulley 322 of a stepping motor 321 and a pulley 323.

A coupler 304 disposed at one end of the base 301 is coupled to the timing belt 324.

Accordingly, driving the stepping motor 321 allows the maintenance unit 300 to be moved in directions indicated by a double-headed arrow X in FIG. 16A.

Figure 17A:
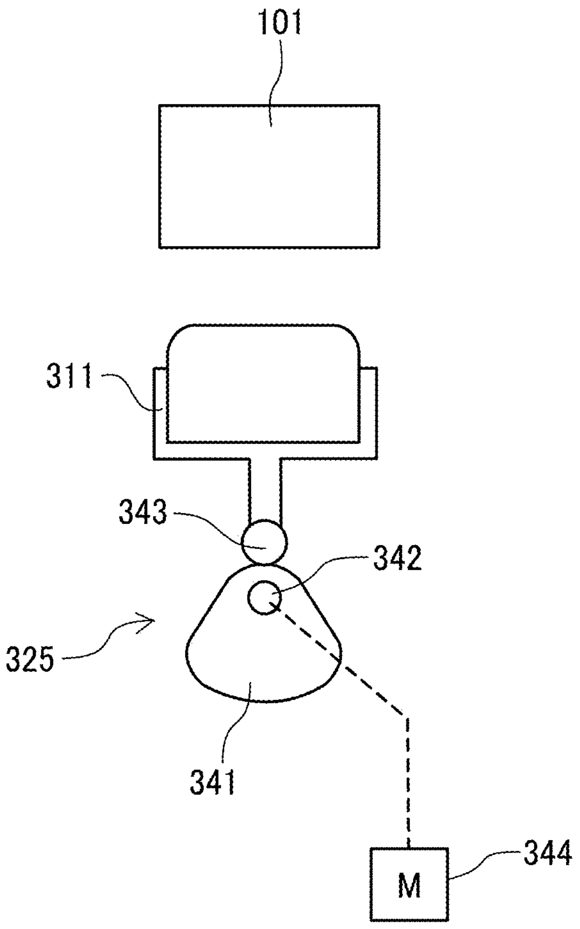
FIGS. 17A and 17B are diagrams each illustrating a lifting mechanism that serves as a cap reciprocating mechanism of a suction cap, according to the fifth embodiment of the present disclosure.
Figure 17B:
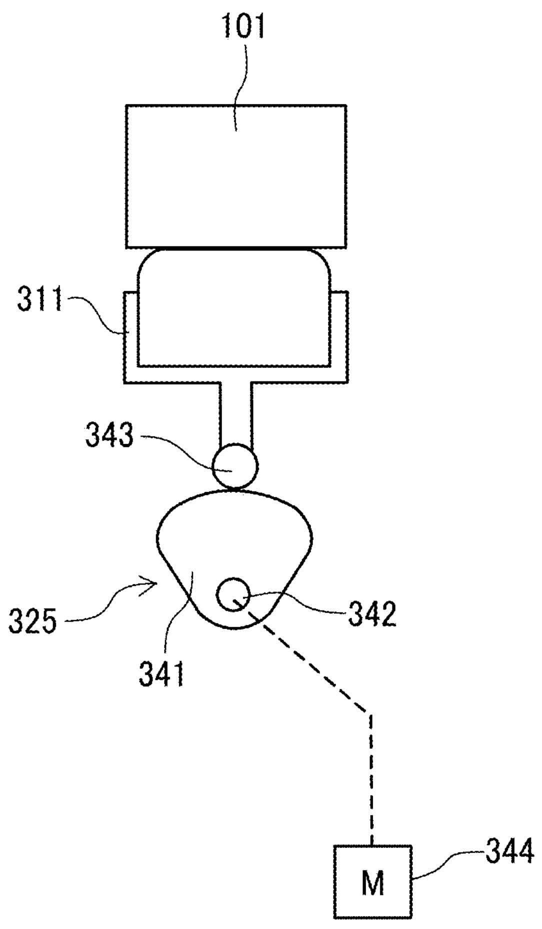

FIG. 17A and FIG. 17B are diagrams each illustrating a lifting mechanism to move up and down the suction cap, i.e., the cap reciprocating mechanism 325, according to the present embodiment.

The cap reciprocating mechanism 325 includes a cam follower 343 with which the suction cap 311 is in contact. The cam follower 343 moves along the peripheral surface of a cam 341 to rotate about a shaft 342 by a cap reciprocating motor 344. Accordingly, the suction cap 311 moves up and down to move toward and retract from the head 101.

Figure 18:
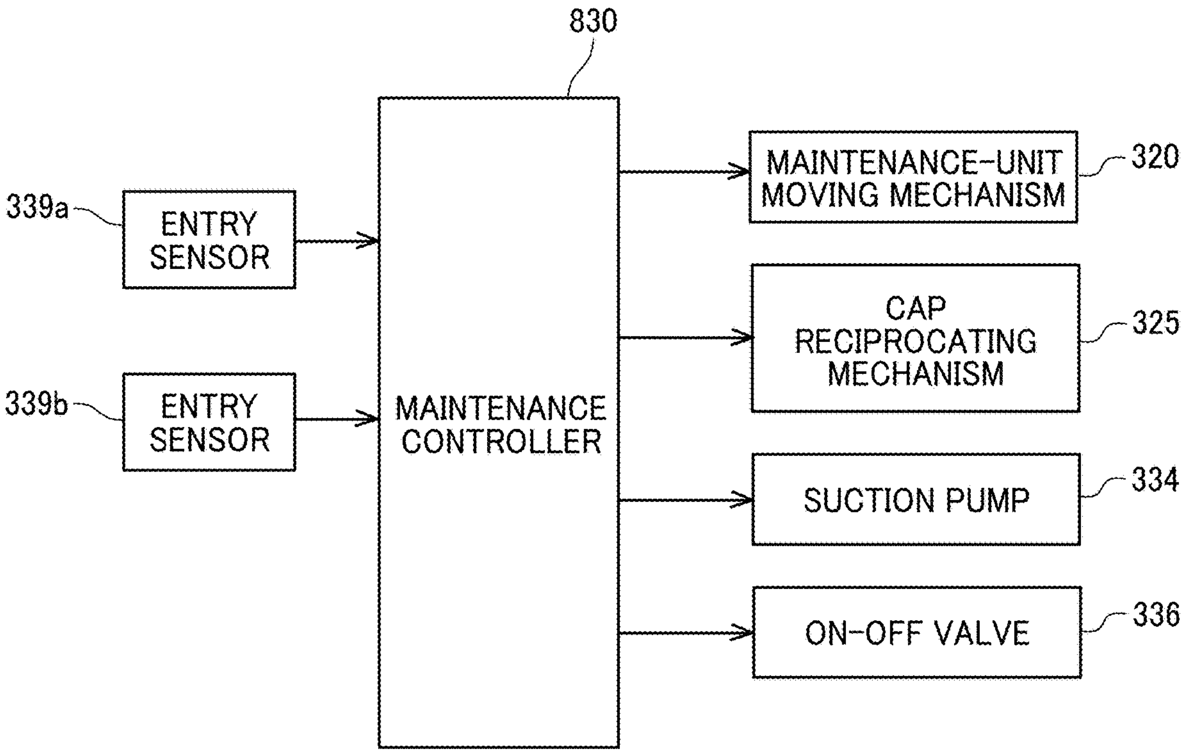
FIG. 18 is a block diagram of a maintenance controller and components related to the maintenance controller, to perform maintenance control, according to the fifth embodiment of the present disclosure.

FIG. 18 is a block diagram of a maintenance controller 830 and components related to the maintenance controller 830, illustrating how maintenance control of the printer 1 is performed, according to a fifth embodiment of the present disclosure.

The maintenance controller 830 drives and controls the motor 321 of the maintenance-unit moving mechanism 320 to control the movement of the maintenance unit 300. The maintenance controller 830 drives and controls the cap reciprocating motor 344 of the cap reciprocating mechanism 325 to control the suction cap 311 such that the suction cap 311 moves toward and retracts from the head 101. The maintenance controller 830 controls driving and stopping of the suction pump 334 to control suction in the suction cap 311, and controls opening and closing of the on-off valve 336 to control opening and closing of the air-release channel 335.

The detection outputs of the entry sensors 339*a* and 339*b* are input to the maintenance controller 830.

The maintenance controller 830 controls a maintenance operation similar to the maintenance operation described in the first embodiment, such that the suction operation of the air-release channel 335 is performed a predetermined number of times, which is once or multiple times, when at least one of the entry sensors 339*a* and 339*b* detects the waste liquid 400 in the air-release channel 335.

Figure 19:
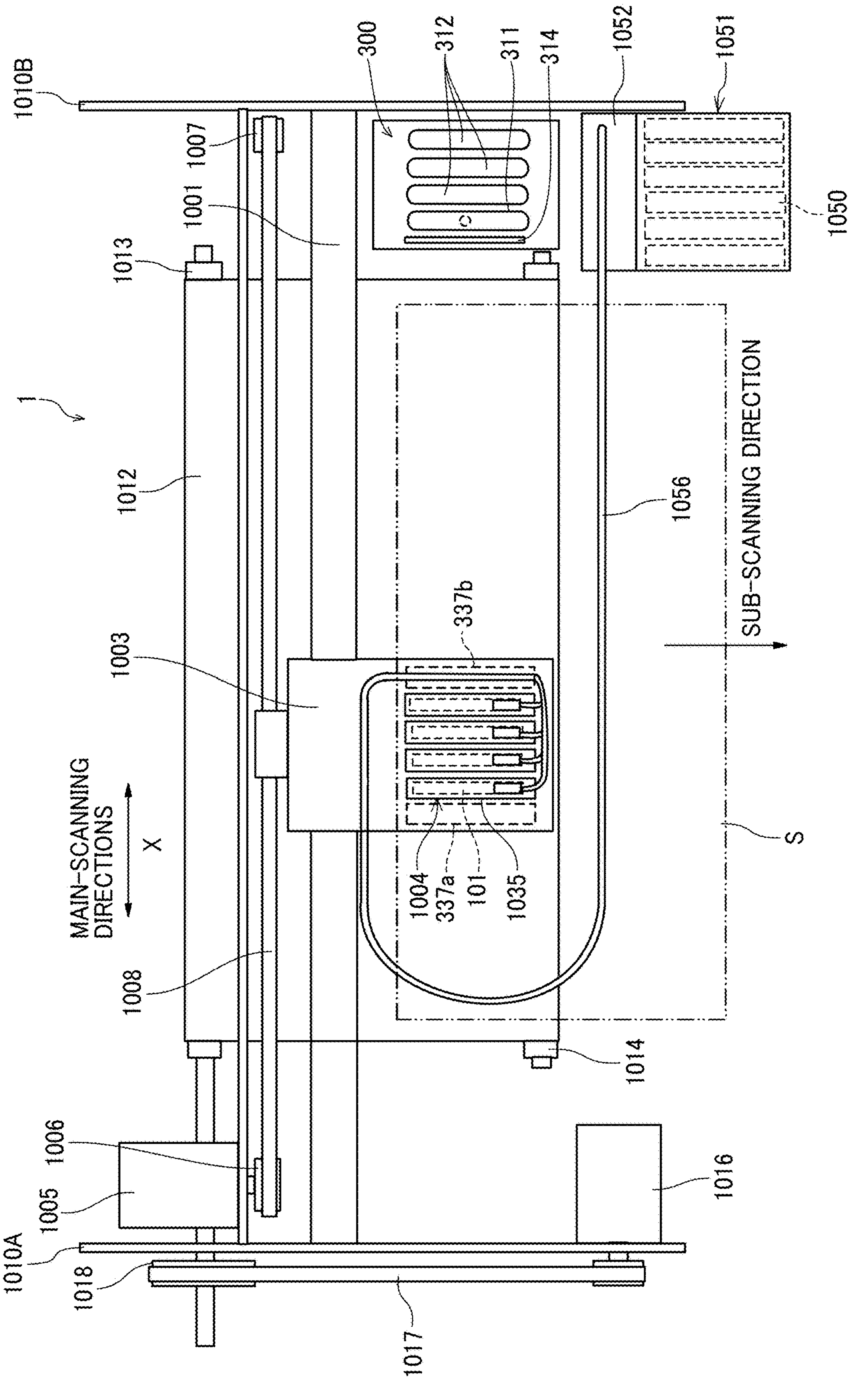
FIG. 19 is a plan view of mechanical components of a printer as an apparatus for discharging liquid, according to a sixth embodiment of the present disclosure.

FIG. 19 is a plan view of mechanical components of the printer 1 as an apparatus for discharging liquid, according to a sixth embodiment of the present disclosure.

Figure 20:
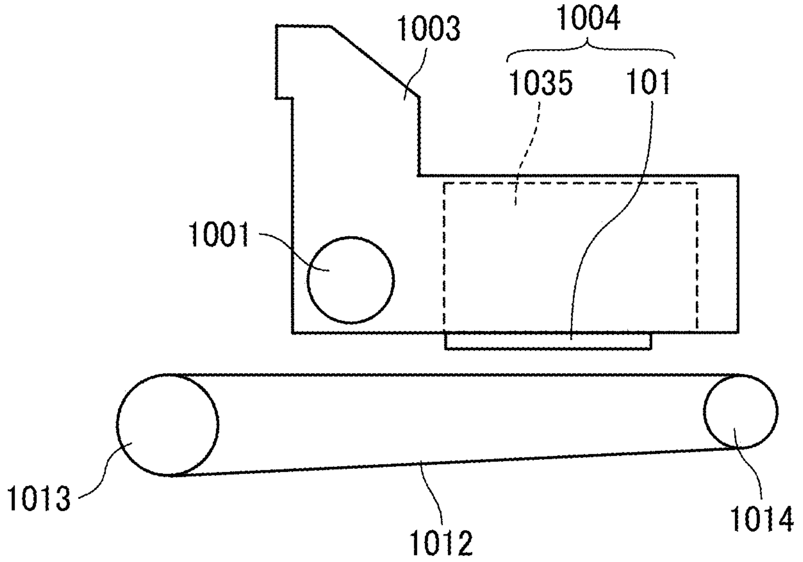
FIG. 20 is a side view of a relevant part of the mechanical components of FIG. 19.

FIG. 20 is a diagram illustrating a lateral side of a relevant part of the mechanical components of the printer 1, according to the sixth embodiment.

The printer 1 is a serial-type printer. A guide 1001 is bridged between a left-side plate 1010A and a right-side plate 1010B to hold a carriage 1003, such that the carriage 1003 is reciprocally movable in main-scanning directions indicated by a double-headed arrow in FIG. 19. The carriage 1003 reciprocates in the main-scanning directions, i.e., the X directions, by a main-scanning motor 1005 via a timing belt 1008 stretched between a driving pulley 1006 and a driven pulley 1007.

Four liquid discharge units 1004 are mounted on the carriage 1003. Each of the liquid discharge units 1004 integrally includes the heads 101 to discharge liquid and a sub-tank 1035.

Each of the heads 101 includes two nozzle rows in which the multiple nozzles 111 are arranged, and each of the nozzle rows is assigned to discharge, for example, black (K), cyan (C), magenta (M), yellow (Y), white (W), or transparent (V) liquid.

The sub-tank 1035 includes a tank to store liquid of multiple colors to be supplied to corresponding one of the heads 101.

A cartridge holder 1051, on which main tanks 1050 containing liquid of multiple colors are replaceably mounted, is disposed in the body of the printer 1. The cartridge holder 1051 includes liquid-feed pumps 1052. The liquid-feed pumps 1052 supply ink of multiple colors from the main tanks 1050 to the sub-tanks 1035, respectively, via supply tubes 1056 for liquid of multiple colors, which are also referred to as a liquid supply channel.

To convey a sheet material S, the printer 1 also includes a conveyance belt 1012 as a sheet conveyor. The conveyance belt 1012 attracts the sheet material S to convey the sheet material S at a position facing the head 101. The conveyance belt 1012 is an endless belt stretched between a conveyance roller 1013 and a tension roller 1014. The conveyance belt 1012 attracts the sheet material S by electrostatic force or air aspiration.

The conveyance belt 1012 rotates in a sub-scanning direction as the conveyance roller 1013 is rotationally driven by a sub-scanning motor 1016 via a timing belt 1017 and a timing pulley 1018.

At one end of a moving range of the carriage 1003 in the main-scanning direction, the maintenance unit 300 that performs maintenance of the heads 101 is disposed lateral to the conveyance belt 1012.

The maintenance unit 300 includes, for example, the suction caps 311, which also serve as the moisture-retention caps to cap the respective nozzle surfaces 112 of the heads 101, the three moisture-retention caps 312, and the blade-shaped wiper 314 to wipe the nozzle surfaces 112.

As described in the first embodiment, the drain channel 333 in which the suction pump 334 as the suction unit is disposed and the air-release channel 335 in which the on-off valve 336 is disposed are connected to the suction cap 311. In the present embodiment, the suction cap 311 and the moisture-retention caps 312 are driven by the cap reciprocating motor 344, which is common to the suction cap 311 and the moisture-retention caps 312, to move toward the heads 101 to the capping positions and to move away from the heads 101 to decapping positions at which the heads 101 are decapped at the same timing.

The lids 337*a* and 337*b* of the maintenance unit 300 are disposed on both sides of the carriage 1003 in the direction in which the heads 101 are arranged.

In the printer 1, a sheet material S is fed onto the conveyance belt 1012 to be attracted onto the conveyance belt 1012 and is conveyed in the sub-scanning direction by the rotation movement of the conveyance belt 1012.

The heads 101 are driven in accordance with the image signal while the carriage 1003 is moved in the main-scanning direction. By so doing, the liquid is discharged onto the sheet material S which is stopped to record one line of an image on the sheet material S. Then, the sheet material S is fed by a predetermined distance to record another line of the image.

The printer 1 ends the recording operation when the printer 1 receives a signal indicating an end of recording or a signal indicating that a rear end of the sheet material S reaches a recording area. Then, the printer 1 ejects the sheet material S outside the printer 1.

Figure 21:
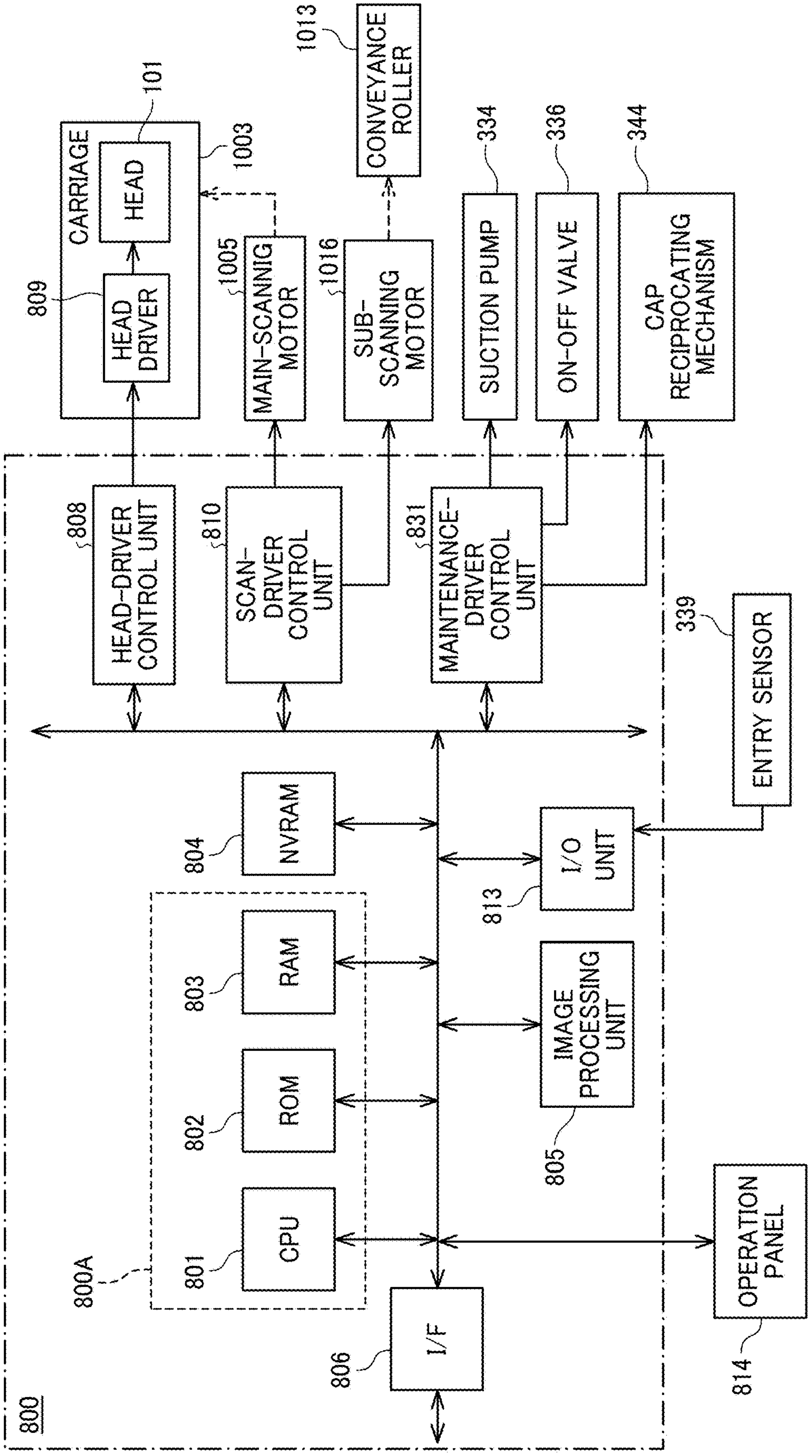
FIG. 21 is a block diagram of a control unit provided for the printer of FIG. 19.

A control unit 800 of the printer 1 according to the present embodiment is described below with reference to a block diagram of FIG. 21.

The control unit 800 includes a central processing unit (CPU) 801, a read only memory (ROM) 802, and a main control unit 800A including a random access memory (RAM) 803. The CPU 801 controls the entire printer 1. The ROM 802 stores fixed data, such as various programs including programs executed by the CPU 801. The RAM 803 temporarily stores image data and other data.

The control unit 800 includes a non-volatile random-access memory (NVRAM) 804 and an image processing unit 805. The NVRAM 804 holds data even while the power supply of the printer 1 is cut off. The image processing unit 805 processes various signals on image data, performs sorting or other image processing, and processes input and output signals to control the entire printer 1.

The control unit 800 includes a head-driver control unit 808 and a head driver 809 as a driver integrated circuit (IC). The head-driver control unit 808 includes a data transmitter to drive and control the heads 101. The head driver 809 drives the heads 101 disposed on the carriage 1003.

The control unit 800 includes a scan-driver control unit 810. The scan-driver control unit 810 drives, for example, the main-scanning motor 1005 for moving and scanning the carriage 1003 and the sub-scanning motor 1016 for driving the conveyance roller 1013.

The control unit 800 includes a maintenance-driver control unit 831 to drive and control the suction pump 334, the on-off valve 336, and the cap reciprocating motor 344 of the maintenance unit 300. In the present embodiment, the carriage 1003 is moved in the main-scanning directions to cause the lids 337*a* and 337*b* to move to respective positions facing the respective suction caps 311. In other words, the maintenance controller 830 described in the above embodiments includes the scan-driver control unit 810 and the maintenance-driver control unit 831.

The control unit 800 includes an input and output (I/O) unit 813. In addition to the detection outputs of the entry sensors 339*a* and 339*b*, the I/O unit 813 acquires the data from a temperature sensor and other various sensors provided for the printer 1, extracts the data to be used for controlling the printer 1, and uses the extracted data for various controls.

The control unit 800 is connected to an operation panel 814 to input and display the data to be used by the printer 1.

The control unit 800 includes an interface (I/F) 806 to send and receive data and signals to and from a host, such as an information processing apparatus, e.g., a personal computer or an image reader. The control unit 800 receives such data and signals from the host with the I/F 806 via a cable or network.

In the present embodiment, when the maintenance operation is performed on the heads 101, the scan-driver control unit 810 moves the carriage 1003 to move the target heads 101 to positions facing the respective suction caps 311.

The maintenance-driver control unit 831 controls a maintenance operation similar to the maintenance operation described in the first embodiment, and controls to perform the air-release channel suction operation a predetermined number of times when at least one of the entry sensors 339*a* and 339*b* detects the waste liquid 400 in the air-release channel 335. When the air-release channel suction operation is performed, the scan-driver control unit 810 controls such that the carriage 1003 is moved to move the lids 337*a* and 337*b* to positions facing the respective suction caps 311.

In embodiments of the present disclosure, the liquid to be discharged is not limited to a particular liquid as long as the liquid has a viscosity or surface tension to be discharged from a liquid discharge head. However, preferably, the viscosity of the liquid is not greater than 30 mPa·s under ordinary temperature and ordinary pressure or by heating or cooling. Specific examples of such liquids include, but are not limited to, solutions, suspensions, and emulsions containing solvents such as water, organic solvents, colorants such as dyes, pigments, functionality imparting materials such as polymerizable compounds, resins, surfactants, biocompatible materials such as deoxyribonucleic acid (DNA), amino acid, protein, calcium, and/or edible materials such as natural colorants. Such liquids can be used as inkjet inks, surface treatment liquids, liquids for forming compositional elements of electric or luminous elements or electronic circuit resist patterns, and three-dimensional object forming material liquids.

Examples of an energy source for generating energy to discharge liquid include a piezoelectric actuator, for example, a laminated piezoelectric element or a thin-film piezoelectric element, a thermal actuator that employs a thermoelectric conversion element, such as a thermal resistor, and an electrostatic actuator including a diaphragm and opposed electrodes.

Examples of the liquid discharge apparatus include an apparatus capable of discharging liquid to a material onto which liquid can adhere and an apparatus to discharge liquid toward gas or into liquid.

The liquid discharge apparatus can include at least one of devices for feeding, conveying, and ejecting a material onto which liquid can adhere. The liquid discharge apparatus can further include at least one of a pretreatment apparatus and a post-treatment apparatus.

The liquid discharge apparatus may be, for example, an image forming apparatus to form an image on a sheet by discharging ink, or a three-dimensional apparatus to discharge a molding liquid to a powder layer in which powder material is formed in layers to form a three-dimensional object.

The liquid discharge apparatus is not limited to an apparatus to discharge liquid to visualize meaningful images, such as letters or figures. For example, the liquid discharge apparatus may be an apparatus to form meaningless images, such as meaningless patterns, or fabricate three-dimensional images.

The above-described term "material onto which liquid can adhere" denotes, for example, a material or a medium onto which liquid is adhered at least temporarily, a material or a medium onto which liquid is adhered and fixed, or a material or a medium onto which liquid is adhered and into which the liquid permeates. Examples of the "material onto which liquid can adhere" include recording media or medium such as a paper sheet, a recording paper, and a recording sheet of paper, film, and cloth, electronic components such as an electronic substrate and a piezoelectric element, and media or medium such as a powder layer, an organ model, and a testing cell. The "material onto which liquid can adhere" includes any material on which liquid adheres unless particularly limited.

The above-mentioned "material onto which liquid can adhere" may be any material as long as liquid can temporarily adhere such as paper, thread, fiber, cloth, leather, metal, plastic, glass, wood, or ceramics.

The term "liquid discharge apparatus" may be an apparatus to relatively move a head and a medium onto which liquid can adhere. However, the liquid discharge apparatus is not limited to such an apparatus. Examples of the liquid discharge apparatus include a serial-type apparatus which moves the liquid discharge head, and a line-type apparatus which does not move the liquid discharge head.

Examples of the liquid discharge apparatus further include a treatment liquid coating apparatus to discharge a treatment liquid to a sheet to coat the treatment liquid on a sheet surface to modify the sheet surface and an injection granulation apparatus in which a composition liquid including raw materials dispersed in a solution is discharged through nozzles to granulate fine particles of the raw materials.

Aspects of the present disclosure are, for example, as follows.

First Aspect

A head-maintenance device includes a suction cap to cap a nozzle surface of a head to discharge liquid, a suction unit to suck the inside of the suction cap, an air-release channel communicating with the inside of the suction cap, a lid to close an opening of the suction cap, and a maintenance controller. The maintenance controller performs an air-release channel suction operation to close the air-release channel and suck the inside of the suction cap by the suction unit, with the opening of the suction cap closed by the lid, and open the air-release channel with the inside of the suction cap in a negative pressure.

Second Aspect

In the head-maintenance device according to the first aspect, the maintenance controller repeats the air-release channel suction operation multiple times w % ben the maintenance controller performs the air-release channel suction operation.

Third Aspect

The head-maintenance device according to the first or second aspect, further includes an absorber disposed on a surface of the lid with which the suction cap contacts.

Fourth Aspect

The head-maintenance device according to any one of the first to third aspects, further includes a liquid sensor to detect the liquid in the air-release channel. The maintenance controller does not perform the air-release channel suction operation when the liquid sensor does not detect the liquid in the air-release channel.

Fifth Aspect

In the head-maintenance device according to any one of the first to fourth aspects, the maintenance controller repeats the air-release channel suction operation multiple times, and the number of repetitions of the air-release channel suction operation varies depending on environmental conditions.

Sixth Aspect

In the head-maintenance device according to any one of the first to fifth aspects, the maintenance controller repeats the air-release channel suction operation multiple times, and the number of repetitions of the air-release channel suction operation varies depending on the type of the liquid.

Seventh Aspect

In the head-maintenance device according to any one of the first to sixth aspects, the maintenance controller repeats the air-release channel suction operation at different timings depending on at least one of the environmental conditions or the type of the liquid.

Eighth Aspect

In the head-maintenance device according to any one of the first to seventh aspects, the maintenance controller repeats the air-release channel suction operation at different timings depending on a job in which the liquid is discharged from the head.

Ninth Aspect

In the head-maintenance device according to any one of the first to eighth aspects, the suction unit sucks the inside of the suction cap, with the nozzle surface capped with the suction cap, at an output of the suction unit higher than the output of the suction unit when the suction unit sucks the inside of the suction cap in the air-release channel suction operation.

Tenth Aspect

The head-maintenance device according to any one of the first to ninth aspects further includes multiple lids including the lid.

Eleventh Aspect

A liquid discharge apparatus includes a head to discharge liquid and the head-maintenance device according to any one of the first to tenth aspects.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A head-maintenance device comprising:

a suction cap to cap a nozzle surface of a head to discharge liquid;

a suction unit to suck an inside of the suction cap;

an air-release channel communicating with the inside of the suction cap;

a lid to close an opening of the suction cap;

processing circuitry to perform an air-release channel suction operation to close the air-release channel and suck the inside of the suction cap by the suction unit, with the opening of the suction cap closed by the lid, and open the air-release channel with the inside of the suction cap in a negative pressure; and a liquid sensor to detect the liquid in the air-release channel, wherein the processing circuitry does not perform the air-release channel suction operation when the liquid sensor does not detect the liquid in the air-release channel.

2. The head-maintenance device according to claim 1, wherein;

the processing circuitry repeats the air-release channel suction operation multiple times when the air-release channel suction operation is performed.

3. The head-maintenance device according to claim 1, further comprising:

an absorber on a surface of the lid with which the suction cap contacts.

4. The head-maintenance device according to claim 1, wherein;

the processing circuitry repeats the air-release channel suction operation multiple times, and the processing circuitry changes a number of repetitions of the air-release channel suction operation depending on environmental conditions.

5. The head-maintenance device according to claim 1, wherein:

the processing circuitry repeats the air-release channel suction operation multiple times, and the processing circuitry changes a number of repetitions of the air-release channel suction operation depending on type of the liquid.

6. The head-maintenance device according to claim 1, wherein:

the processing circuitry performs the air-release channel suction operation at different timings depending on at least one of environmental conditions or type of the liquid.

7. The head-maintenance device according to claim 1, wherein;

the processing circuitry performs the air-release channel suction operation at different timings depending on a job in which the liquid is discharged from the head.

8. The head-maintenance device according to claim 1, wherein:

the suction unit is a pump.

9. The head-maintenance device according to claim 8, wherein:

The lid includes a rigid material having a flat surface.

10. The head-maintenance device according to claim 8, wherein:

the lid and the nozzle surface of the head are disposed at a same height.

11. A liquid discharge apparatus, comprising:

the head to discharge liquid; and the head-maintenance device according to claim 1.

12. A head-maintenance device, comprising:

a suction cap to cap a nozzle surface of a head to discharge liquid;

a suction unit to suck an inside of the suction cap;

an air-release channel communicating with the inside of the suction cap;

a lid to close an opening of the suction cap; and processing circuitry to perform an air-release channel suction operation to close the air-release channel and suck the inside of the suction cap by the suction unit, with the opening of the suction cap closed by the lid, and open the air-release channel with the inside of the suction cap in a negative pressure, wherein the suction unit sucks the inside of the suction cap, with the nozzle surface capped with the suction cap, at an output of the suction unit higher than an output of the suction unit when the suction unit sucks the inside of the suction cap in the air-release channel suction operation.

13. The head-maintenance device according to claim 12, wherein:

the processing circuitry repeats the air-release channel suction operation multiple times when the air-release channel suction operation is performed.

14. The head-maintenance device according to claim 12, further comprising:

an absorber on a surface of the lid with which the suction cap contacts.

15. The head-maintenance device according to claim 12, wherein:

the suction unit is a pump.

16. A head-maintenance device for use with a nozzle array including multiple heads, the nozzle array comprising:

a suction cap to cap a nozzle surface of at least one of the heads;

a suction unit to suck an inside of the suction cap;

an air-release channel communicating with the inside of the suction cap;

a plurality of lids, each to close an opening of the suction cap; and processing circuitry to perform an air-release channel suction operation to close the air-release channel and suck the inside of the suction cap by the suction unit, with the opening of the suction cap closed by one of the lids, and open the air-release channel with the inside of the suction cap in a negative pressure.

17. The head-maintenance device according to claim 16, wherein:

the processing circuitry repeats the air-release channel suction operation multiple times when the air-release channel suction operation is performed.

18. The head-maintenance device according to claim 16, further comprising:

an absorber on a surface of the lid with which the suction cap contacts.

19. The head-maintenance device according to claim 16, wherein:

the suction unit is a pump.

* * * * *